Patented Feb. 4, 1936

2,029,694

UNITED STATES PATENT OFFICE 2,029,694

ESTERIFICATION PROCESS

William J. Bannister, Terre Haute, Ind., assignor to Commercial Solvents Corporation, Terre Haute, Ind., a corporation of Maryland No Drawing. Application July 30, 1934, Serial No. 737,598

5 Claims. (Cl. 260—106)

My invention relates to the production of volatile esters of relatively non-volatile carboxylic acids and is particularly adapted to the production of alkyl lactates.

In the past, esters such as methyl and ethyl lactates, methyl caproate, ethyl oxalate, and the like have been prepared by reacting the acid and alcohol at the boiling point of the latter, and removing the water of reaction and excess alcohol by distillation. This procedure is economically disadvantageous since low conversions are obtained and the time of reaction is unduly long, with resulting losses from decomposition and side reactions.

I have now discovered that highly satisfactory conversions may be obtained in a relatively short reaction period by means of the process hereinbelow described. This process is particularly advantageous for esters of this type since the ester is removed from the sphere of reaction as rapidly as it is formed and the opportunity for hydrolysis or decomposition is thus reduced to a minimum. Further advantages of my process will be apparent from the following description.

My process comprises, essentially, a distillation in which the esterifying alcohol is added to the acid at a temperature slightly below the boiling point of the formed ester while continuously removing the vapors of the excess alcohol, the formed ester, and the water of reaction. It will be seen that in this process the esterification is aided both by an increased temperature and by removal of the reaction products. This gives rise to a reaction velocity sufficiently great to enable the process to be operated continuously with a very satisfactory yield per unit of time per unit of apparatus.

This process is applicable, generally, to the production of relatively volatile esters of non-volatile acids. By the term "volatile esters" in this connection is meant esters which may be distilled at atmospheric pressure without substantial decomposition. The esters particularly suited for this purpose are those having boiling points in excess of 120° C. but not substantially less than 50° C. below the boiling point of the acid being esterified. It will be seen that esters having boiling points within this range may be distilled from the reacting mixture without removing the esterifying alcohol at too rapid a rate to allow reaction to take place. This process is particularly adapted to the production of esters such as ethyl lactate.

My process may be carried out with or without the use of esterification catalysts, but in most cases I prefer to utilize a non-volatile catalyst such as sulphuric acid. Any of the known non-volatile esterification catalysts will be found to be suitable for my process and these may be employed in the concentrations utilized in other esterification processes. In most cases, a concentration equivalent to approximately 1% by weight of concentrated sulphuric acid, based upon the weight of the carboxylic acid being esterified, will be found to be satisfactory.

The acids employed in my process may be any of the relatively non-volatile carboxylic acids and should preferably be in an anhydrous or dehydrated state. For example, in the case of lactic acid, the material should first be dehydrated by heating to form a mixture of lactide and lactyl lactic acid which is stable at temperatures corresponding to the boiling point of the alkyl ester to be produced. Likewise, in the case of oxalic acid, the removal of water of crystallization from the acid prior to the esterification reaction will enable the acid to be maintained at the desired temperature for esterification.

My process may be operated at temperatures not substantially above the boiling point of the formed ester nor substantially more than 20° below this temperature. In some cases, at temperatures above the boiling point of the ester, the latter is completely removed from the acid, leaving it in a solid or highly viscous state which is mechanically undesirable for effecting the esterification reaction. In other cases, maintaining the esterification above the boiling point of the ester permits a substantial amount of the acid to distill over with the ester. At a temperature slightly below the boiling point of the ester, on the other hand, a small amount of ester is constantly present in the reaction mixture giving the latter a consistency suitable for effective contact with the added alcohol. Of course, it will be apparent to those skilled in the art that in certain cases, especially where impure raw materials such as crude commercial lactic acid are employed, the temperature should be maintained at a somewhat lower point in order to avoid undesirable side reactions or decomposition. In most cases, however, a temperature not more than 20° below the boiling point of the ester will be found to be eminently satisfactory.

In order to secure adequate contact of the alcohol and acid at the beginning of the reaction, I prefer to add a small amount of alcohol and raise the temperature slowly to the desired point, after which further alcohol is continuously introduced. In this manner a suitable consistency is obtained at the beginning of the esterification and is maintained throughout the reaction. Any suitable mechanical means for securing adequate contact may be employed, as for example, the use of a distributing spider for the introduction of the alcohol or the use of mechanical agitation.

My invention may perhaps best be illustrated by the following specific example: About 240 gallons of commercial 44% lactic acid containing 1100 lbs. of 100% acid is charged over the course of a few hours into a 200 gallon copper-lined steam-jacketed kettle equipped with a condenser and two receivers. Steam is turned into the jacketed kettle and water is removed by vacuum distillation, gradually raising the temperature to about 140° C. At this point the dehydration of the acid is substantially complete and the material comprises essentially lactide and a small amount of lactyl lactic acid. To this material there is added 38 gallons of methanol previously mixed with 40 lbs. of concentrated sulphuric acid (sp. gr. 1.84), 10 lbs. of the acid serving as a catalyst and the remainder to convert any calcium lactate present to lactic acid and calcium sulphate. This mixture is refluxed for one hour during which time esterification takes place to a certain extent and the temperature rises from an initial liquid temperature of 90° C. to a temperature of about 125° C. At this point direct distillation is started, and when the liquid temperature reaches 130 to 140° C., preferably 140° C. methanol is introduced through a distributing pipe located at the bottom of the reaction liquid. As the distillation proceeds methanol is continuously added at such a rate as to maintain the temperature at 140° C. During this distillation the volume of the reaction mixture decreases at a steady rate as the formed ester is immediately distilled off with the excess methanol. The collected distillate consists of about 285 gallons of a mixture of approximately 50% by weight methyl lactate, 8-10% water, and 42-40% methanol. This distillate may be purified by any known procedure, as for example, by neutralizing any acidity and fractionally distilling.

Although my invention is specifically illustrated by the above example, it is to be distinctly understood that it is not limited to the particular materials or procedures disclosed. The general applicability of my process to the production of esters of this type will readily be seen by those skilled in the art. In adapting my process to the production of any particular ester the main consideration will be the choice of the operating temperature in accordance with the principles previously outlined. For example, in the production of ethyl lactate from dehydrated lactic acid of satisfactory purity a temperature of 135-145° C. will usually be satisfactory. Likewise, for the production of normal butyl lactate a temperature of 165-175° C. may be employed. As further examples of esters which may be produced by my process there may be mentioned ethyl isooxybutyrate, normal propyl isooxybutyrate, methyl caproate, methyl valerate, methyl glycollate, and ethyl glycollate. In general, it may be said that my process is applicable to the production of volatile aliphatic esters of relatively non-volatile carboxylic acids, the said esters having boiling points not substantially less than 120° C. and at least 50° C. below that of the corresponding acids.

It will likewise be apparent to those skilled in the art that various modifications of procedure may be employed without departing from the scope of my invention. For example, instead of introducing liquid alcohol below the surface of the heated acid, the alcohol could be vaporized in a separate vessel and the vapors introduced into the acid in a like manner. It will also be evident that equivalent procedures may be employed for securing the contact of the acid and alcohol at a temperature slightly below the boiling point of the formed ester. For example, the acid and an excess of alcohol could be heated under pressure, thus maintaining a suitably high temperature and removing the formed ester and any water as rapidly as these materials are formed. In general, it may be said that the use of any equivalents or modifications of procedure which would naturally occur to one skilled in the art may be employed without departing from the scope of my invention.

My invention now having been described, what I claim is:

1. In a process for the production of an aliphatic ester of a carboxylic acid, the said ester having a boiling point in excess of 120° C. but not substantially less than 50° C. below the boiling point of the said acid, the step which comprises introducing the esterifying alcohol into the acid to be esterified, at a temperature ranging from approximately the boiling point of the formed ester to approximately 20° C. below said boiling point, and removing the resulting vapors of the formed ester, water, and excess alcohol.

2. In a process for the production of an aliphatic ester of a carboxylic acid, the said ester having a boiling point in excess of 120° C. but not substantially less than 50° C. below the boiling point of the said acid, the step which comprises introducing the esterifying alcohol into the acid to be esterified, in the presence of a non-volatile esterification catalyst, at a temperature ranging from approximately the boiling point of the formed ester to approximately 20° C. below said boiling point, and removing the resulting vapors of the formed ester, water, and excess alcohol.

3. In a process for the production of methyl lactate, the step which comprises introducing methyl alcohol into partially dehydrated lactic acid, at a temperature ranging from 130° C. to 140° C., and removing the resulting vapors of methyl lactate, water, and excess alcohol.

4. In a process for the production of ethyl lactate, the step which comprises introducing ethyl alcohol into partially dehydrated lactic acid, at a temperature ranging from 135° C. to 145° C., and removing the resulting vapors of ethyl lactate, water, and excess alcohol.

5. In a process for the production of normal butyl lactate, the step which comprises introducing normal butyl alcohol into partially dehydrated lactic acid, at a temperature ranging from 165° C. to 175° C., and removing the resulting vapors of butyl lactate, water, and excess alcohol.

WILLIAM J. BANNISTER.